R. MILNE.
CENTERING MACHINE.
APPLICATION FILED MAY 22, 1908.
968,489.
Patented Aug. 23, 1910.
2 SHEETS—SHEET 1.
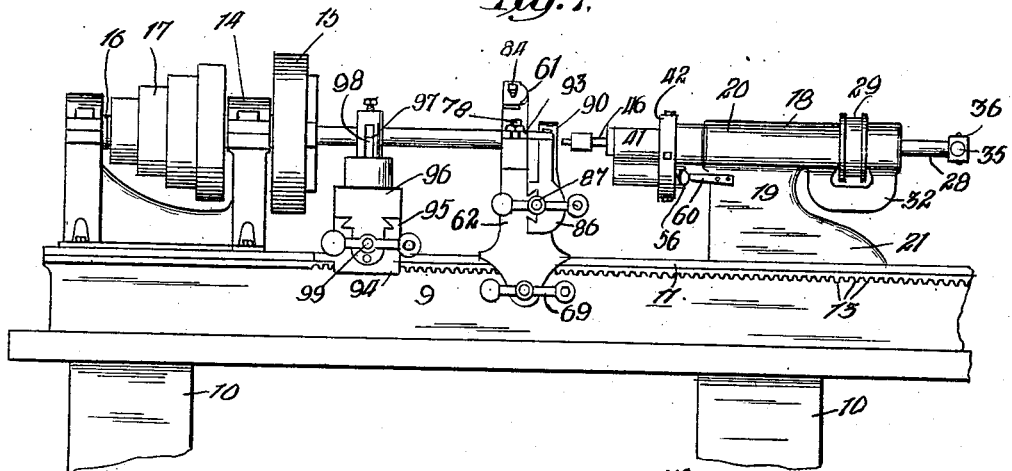
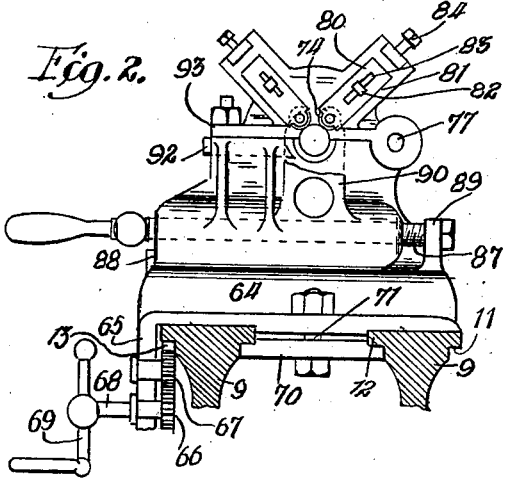
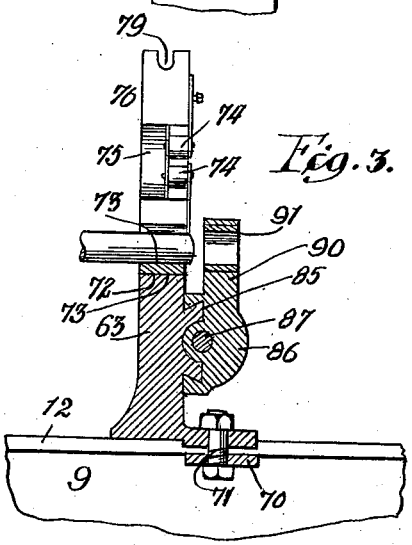
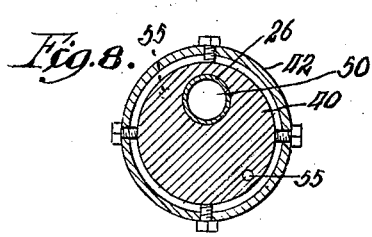
Witnesses:
Wm. P. Bond
Pierson W. Banning
Inventor:
Robert Milne
by Banning & Banning
Attys.

R. MILNE.
CENTERING MACHINE.
APPLICATION FILED MAY 22, 1908.
968,489.
Patented Aug. 23, 1910.
2 SHEETS—SHEET 2.
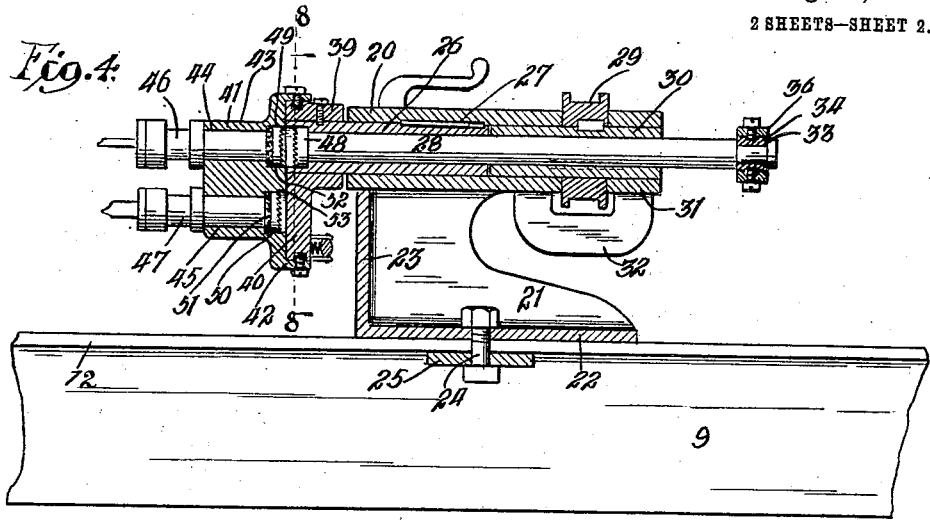
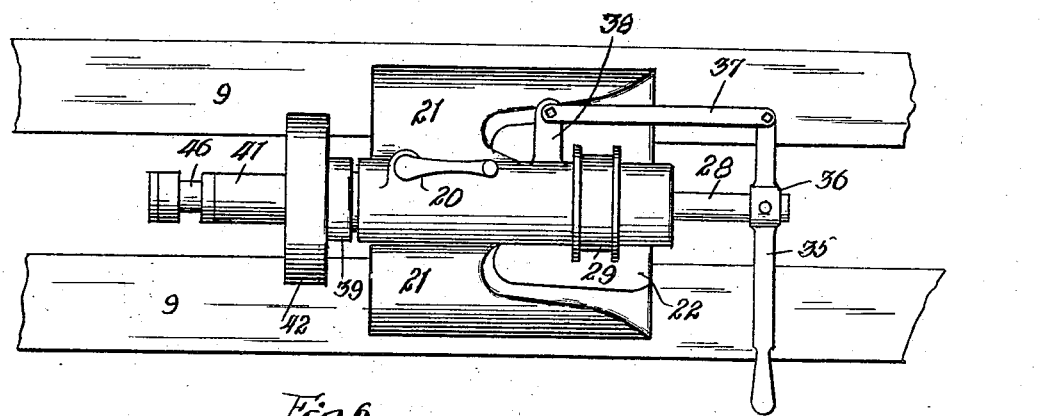
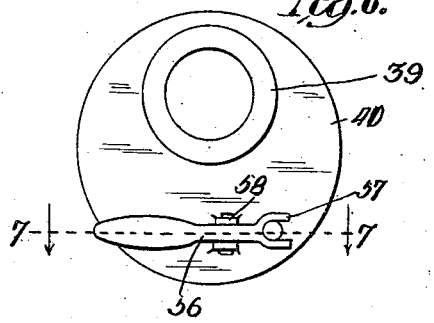
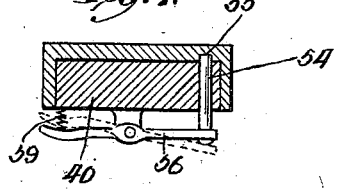
Witnesses:
Inventor:
Robert Milne
by Banning & Banning
Attys.

UNITED STATES PATENT OFFICE.

ROBERT MILNE, OF ROCKFORD, ILLINOIS, ASSIGNOR TO ROCKFORD DRILLING MACHINE COMPANY, A CORPORATION OF ILLINOIS.

CENTERING-MACHINE.

968,489.

Specification of Letters Patent. Patented Aug. 23, 1910.

Application filed May 22, 1908. Serial No. 434,363.

*To all whom it may concern:*

Be it known that I, ROBERT MILNE, a citizen of the United States, residing at Rockford, in the county of Winnebago and State of Illinois, have invented certain new and useful Improvements in Centering-Machines, of which the following is a specification.

This invention is intended primarily for use in rounding off the ends of rods or spindles and thereafter drilling a counter-bored hole adapted to receive the tail stock of a lathe in the subsequent milling or turning of the work.

The object of the invention is to facilitate these operations and at the same time provide means whereby the counter-bored holes will be drilled exactly in the center of the end of the rod or spindle, and to provide means whereby the revolving work will be held rigidly and exactly in position to receive the bit during the drilling operation.

The invention further relates to the construction and arrangement of the tail stock of the machine whereby bits or tools of different sizes can be alternately thrown into clutch with the tail driving machanism and positioned to drill, in the end of the work, holes of varying shape or diameter.

The invention also relates to the construction and arrangement of the adjustable steady rest which receives and holds the end of the work during the application of the drill thereto.

The invention consists in the features of construction and combination of parts hereinafter described and claimed.

In the drawings, Figure 1 is a side elevation of the entire machine, with the exception of a portion of the trackway and table, which are broken away; Fig. 2 a cross sectional view showing the steady rest for holding the work positioned; Fig. 3 a longitudinal sectional view of the steady rest and the adjustable slide mounted thereon; Fig. 4 a longitudinal sectional view of the tail stock; Fig. 5 a top or plan view of the same; Fig. 6 a rear face view of the eccentric bit mounting; Fig. 7 a view taken on line 7—7 of Fig. 6 looking in the direction of the arrow; and Fig. 8 a cross sectional view taken through the eccentric bit mounting on line 8—8 of Fig. 4, looking in the direction of the arrow.

The machine as a whole is mounted upon a table comprising side rails 9 and legs or uprights 10. The side rails are provided, at the top, with outer overhanging flanges 11 and inner overhanging flanges 12, the top surfaces of the companion rails furnishing a trackway for the support of mechanism mounted thereon. The outer flange 11 is provided, on its under face, with teeth 13 which furnish, in effect, a rack extending from end to end of the table. At one end of the table is located a head stock 14 comprising a universal chuck 15, of standard formation, mounted upon a shaft 16 carrying a cone pulley wheel 17. The head stock is of a style ordinarily used with lathes and need not be described more fully in detail. The tail stock 18 is mounted upon a frame 19 comprising a bearing head 20 carried by feet 21, which feet are connected by a floor 22 and a front wall 23. The floor rests upon the surface of the side rails at the table, and the frame is held in position by means of a bolt 24 entered through a clamping plate 25 and through the floor, the ends of which clamping plate engage the overhanging inner flanges 12 of the side rails. The bearing head 20 serves as a mounting for a slidable bearing sleeve 26 which is longitudinally movable within the bearing head but is held against rotation by means of an elongated spline 27. The bearing sleeve 26 serves as a journal mounting for a shaft 28 which carries a grooved pulley wheel 29 splined to an elongated sleeve 30 which is journaled within a journal bearing 31, which journal bearing is connected with the main journal head 20 by a bent arm or elbow 32 which embraces the grooved pulley wheel. The end of the shaft 28 is provided with a groove 33 which receives a ring 34 carried by a lever 35 which is provided, at a suitable point, with a forked head 36 which embraces the ring 34. The rear end of the lever is pivoted to a link 37 which in turn is pivoted to a tongue 38 outwardly extending from the journal head.

The forward end of the sleeve 26 is entered into and rigidly held within a socket 39 which is eccentrically positioned upon a disk-shaped clutch head 40. The clutch head serves as a mounting for an adjustable bit socket 41 which comprises a recessed body 42 mounted upon the clutch head 40, which body has forwardly projecting therefrom a double sleeve member 43 which is bored out to provide bit bearings 44 and 45, which bearings receive bit holders 46 and 47, respectively. The bit bearings are positioned equidistant from the center of the circular clutch head 40 so that either of the bit bearings may be brought into register with the end of the shaft 28. The end of the shaft is provided with an enlarged toothed clutch member 48 which is adapted to engage with either the clutch member 49 or the clutch member 50 formed on the bit holders 46 and 47, respectively. The clutch members 49 and 50 are each provided with a bearing ring 51, and the clutch members, being of larger diameter than the bit bearings 44 and 45, are revoluble within enlarged bearing recesses 52 and 53. The clutch members are entirely housed within the recesses provided therefor, so that the entire bit holder can be revolved around the circular clutch head 40 as a bearing when it is desired to throw one or the other of the bits into commission. In order to hold the parts in adjusted position, a pin 54 is provided which is entered through a hole in the clutch head and is adapted to register with either one of two holes 55 in the recessed body of the bit holder, which pin serves to hold the bit holder in position to bring either of the bits into register with the end of the shaft. In order to facilitate the adjustment, a pivoted lever 56 is provided, the end 57 of which is forked to receive the end of the pin. The lever is pivoted between ears 58 and is held in position to normally project the pin into one of the holes 55 by means of a spring 59 which bears against the free end of the lever. The handle of the lever is adapted to be engaged by a stop 60 which forwardly projects from the frame 19 of the tail stock, which stop acts against the lever and automatically serves to disengage the bit holder and permit it to be readjusted when the parts have been retracted to their rearmost position, as will be more fully explained.

The steady rest 61 is in the form of an adjustable frame 62 comprising an upright transversely extending wall 63 mounted upon a base plate 64 which rests upon the top of the side rails as a bearing. The base plate, on its forward side, has depending therefrom a bracket arm 65 which overhangs the rack 13 and affords a bearing for an adjusting pinion 66 and an intermediate meshing pinion 67, which latter meshes with the rack. The adjusting pinion is located upon a shaft 68 which carries a handle 69 which, being revolved, serves to adjust the frame along the table to any desired position, the intermediate pinion being provided to impart travel in the direction of rotation of the handle. The base plate 64 is adapted to be held in adjusted position by means of a clamping plate 70 which has a bolt 71 entered therethrough. The wall 63 is provided, at its upper edge, with a recess 72 adapted to receive a half ring bushing 73 of suitable size to accommodate the diameter of the intended work. The bushing coöperates with a pair of rollers 74 which are journaled within a recess 75 in a jaw 76 which is hinged by means of a pivot pin 77 to the rear side of the frame and is adapted to be held in clamped position by means of a hinged clamping bolt 78 positioned to engage a slot 79 in the free end of the jaw. The rollers 74 are pivoted at the ends of a pair of obliquely extending adjustable blocks 80 which are slidably mounted within recessed guideways 81 in the jaw and are held against displacement by means of bolts 82 entered through slots 83 in the blocks. Retraction of the blocks is prevented by means of end screws 84 which bear against the ends of the blocks, as shown in Fig. 2. The wall 63 is provided, on the side adjacent the tail stock, with horizontal guideways 85 which afford a mounting for a slide 86 adapted to be laterally adjusted by means of a screw 87 entered through the slide, the movement of which slide, in opposite directions, is adapted to be limited by means of a forward stop 88 and a rear stop 89.

The slide is provided with an upwardly projecting tongue 90 which is bored out to receive a hardened bearing ring 91 which, when the slide has been thrown to its forward position, will be exactly in register with the end of the work supported upon the bushing 73 and held in position by the adjustable rollers 74. The slide is further provided with a cutting tool 92, the inner end of which is adapted to be brought into engagement with the work as the slide is moved toward its rearmost position, so that, as the final limit of rear movement of the slide is reached, the tool will have completed its cutting operation and will be brought to the center of the work. The tool is clamped in position by means of a plate 93 located on the top of the slide.

The machine can, if desired, be provided with a cut-off 94 which comprises an adjustable frame 95 and a slide 96 having a tool post 97 adapted to receive a tool 98 for cutting off the stock, or forming it, or both. The slide is provided with an adjusting screw 99, whereby its position with respect to the work can be adjusted. The cut-off mechanism, however, is of ordinary standard type and can be dispensed with without affecting the remaining portions of the machine.

In using the machine of the present invention, the work, which is usually in the form of a raw rod or spindle, is positioned within the machine and its head end secured by the head chuck. The center rest is then moved to a position in which the tail end of the rod or spindle will project slightly beyond the bushing 72, after which the hinged jaw is brought down and the rollers 74 adjusted to bear firmly against the work. The rollers are provided so that a firm pressure can be brought to bear upon the work without marking it, which might be the case if a non-rotatable bearing block were provided. After the tail end of the work has been thus firmly clamped, the head chuck will be revolved and the slide carrying the tool advanced to a suitable position to round off or otherwise finish the end of the rod or spindle. After the spindle has thus been finished the slide will be retracted to the limit of its movement, which brings the bearing ring 91 into exact register with the end of the work, after which a hole or holes can be drilled in the center of the end of the rod or spindle in position to receive the tail bearing of the lathe.

The drilling operation is performed by adjusting the bit socket in such position on the clutch head as to bring the desired bit into register with the clutch end of the shaft 28. The shaft 28 will be constantly revolved in a direction opposite the travel of the work, which revolution will be imparted to the shaft through the sleeve 30 which is keyed to the grooved pulley wheel 29 and also to the shaft itself. When it is desired to bring the bit into position for drilling, the lever 35 will be pulled forward, which imparts a longitudinal movement to the shaft 28, which initially engages the clutch members and thereafter carries forward the slidable sleeve 26 and with it the clutch head and bit socket, thereby maintaining the shaft in clutch with the bit holder, which for the time being registers therewith, and imparting rotary movement to the intended bit. In finishing the ends of rods or spindles for the lathe, it is customary to drill a small hole sufficiently deep to afford a clearance for the point of the tail stock of the lathe, and then, by a second drilling operation, to ream out the edge of the hole by means of a larger bit. In using the device of the present invention for the above purpose, a hole will be drilled with a smaller bit and thereafter the shaft will be drawn back, carrying with it the sleeve and connected parts, and, as the sleeve is drawn back, the end of the lever 56 will be brought into contact with the stop 60 so that continued movement throws the lever and retracts the pin 54, thereafter allowing the bit socket to be turned around the disk-shaped clutch head as an axis until the second drill holder is brought into register with the clutch end of the shaft, after which the second drilling operation can be performed. As the bit holder is advanced, its end will be entered into the ring 91 prior to the engagement of the bit with the end of the work, so that the bit will be held rigidly in position, within the ring 91, during the drilling operation. The work will be rotated in one direction and the drill in the opposite direction, and this fact further tends to properly center the holes and at the same time facilitates the drilling operation by doubling the drilling speed.

The invention is one which enables the operations above mentioned to be performed with very little manipulation on the part of the operator, and the arrangement is such that the work will be properly centered and the drilling perfectly performed at all times.

What I regard as new and desire to secure by Letters Patent is:

1. In a machine of the class described, the combination of a head chuck, longitudinally movable drill mechanism, a steady rest, a slide carried by and adjustable across the steady rest, and provided with a cutting tool adapted to engage the work when the slide is moved to one position, and a tongue provided with an opening adapted to receive the end of the drill when the slide is moved to another position, substantially as described.

2. In a machine of the class described, a steady rest, a slide movable across the steady rest and provided with a cutting tool adapted to engage the work when the slide is moved to one position, and a member formed on the steady rest serving as a guide and support for said slide, said member having beveled side walls adapted to engage the beveled side walls of a recess formed in the slide, substantially as described.

ROBERT MILNE.

Witnesses:
SAMUEL H. RECK,
WALTER B. BIRNE.